Aug. 24, 1965
P. O. CALAFAT MAS
3,202,124
NAVIGATIONAL VEHICLES
Filed Nov. 19, 1963
2 Sheets-Sheet 1
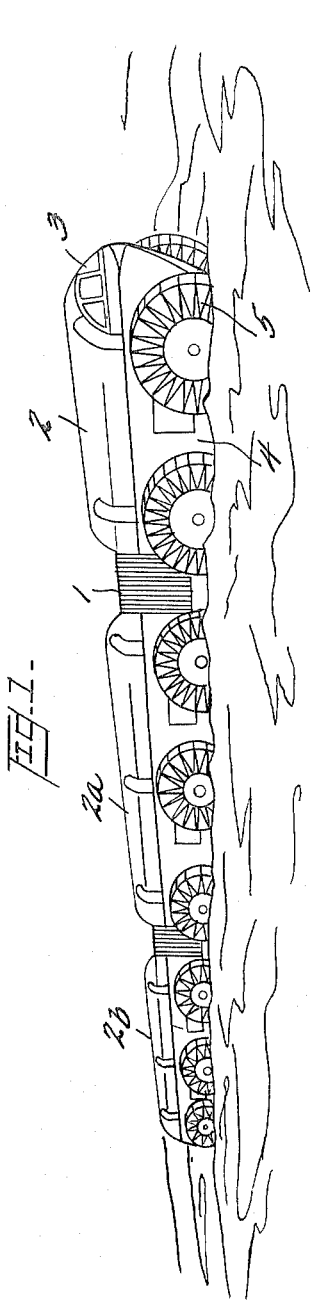
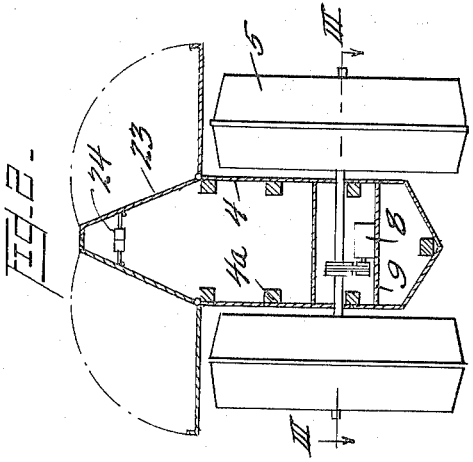
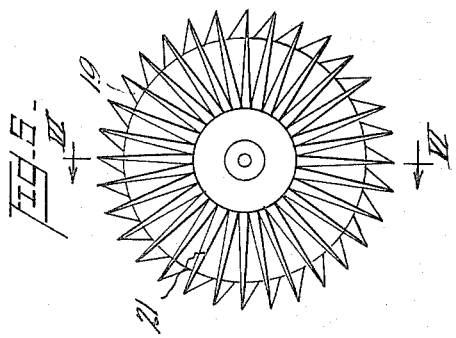
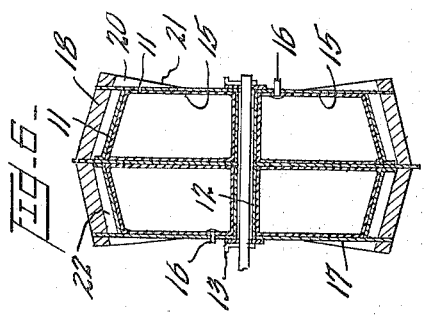
INVENTOR
Pierre O. Calafat Mas,
BY Watson, Cole, Grindle & Watson
ATTORNEYS

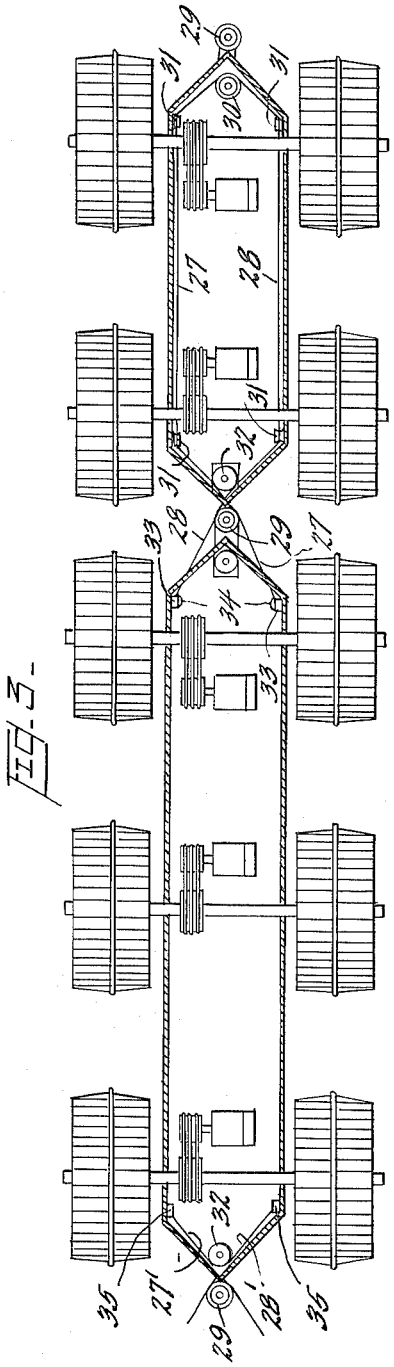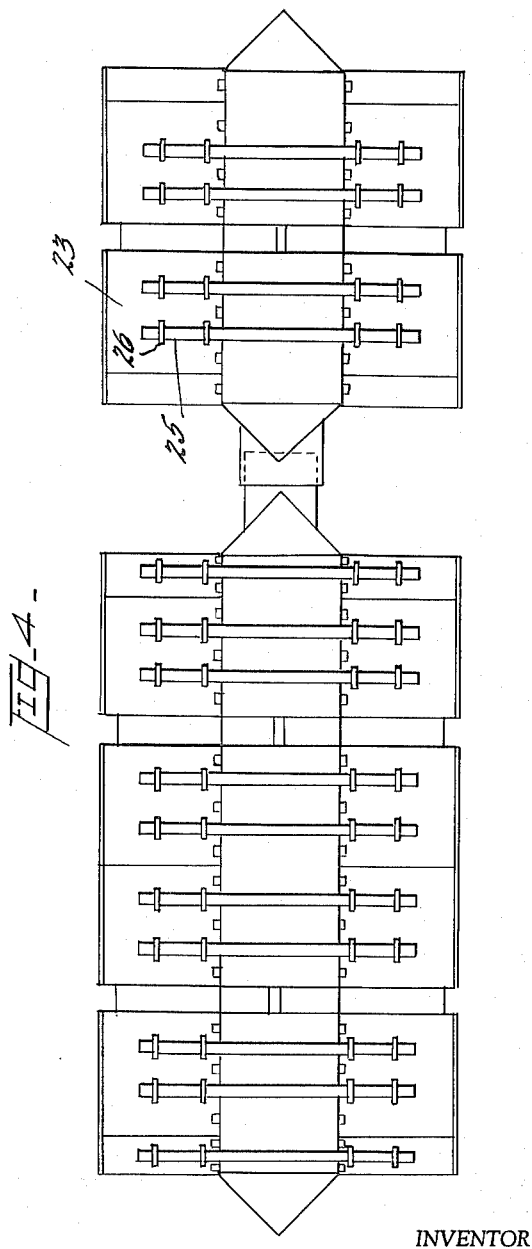

United States Patent Office 3,202,124
Patented Aug. 24, 1965

3,202,124
NAVIGATIONAL VEHICLES
Pierre O. Calafat Mas, 17 Ave. Carnot, Saint-Max, Meurthe-et-Moselle, France
Filed Nov. 19, 1963, Ser. No. 324,617
Claims priority, application France, Nov. 30, 1962, 917,199
1 Claim. (Cl. 115—1)

The present invention relates to a vehicle adapted to move on water, said vehicle consisting essentially of a hull equipped with a plurality of pairs of wheels acting both as lateral floating members and as driving engines for the vehicle.

Preferably, all the wheels are driving wheels and, besides, several vehicles of this type may be coupled to one another, the head vehicle being arranged to enable the piloting of the train of vehicles thus formed.

The volume of the wheels is important with respect to that of the hull resulting in a lifting of the bow when the vehicle is advancing, thus substantially reducing the resistance to its forward motion and enabling the vehicle to reach important speeds. Besides, these wheels assure the vehicle a high stability and an excellent controllability.

The manner in which the device is arranged in accordance with the principles of the invention is explained in the following specification, in connection with the accompanying drawings, in which:

FIGURE 1 is a perspective diagrammatic view of a train of vehicles in accordance with the invention.

FIGURE 2 is a cross-sectional vertical view of the vehicle.

FIGURE 3 is a cross-sectional view along line III—III of FIGURE 2 illustrating a plurality of vehicles coupled to one another.

FIGURE 4 is a plan view of a train of vehicles according to the invention.

FIGURE 5 is an elevational view of a wheel.

FIGURE 6 is a cross-section through line VI—VI of FIGURE 5.

The train of vehicles as shown in FIGURE 1 comprises three elements coupled to one another and connected by means of through-communication flexible vestibules 1. The head or front vehicle 2 comprises the piloting cabin 3, such cabins not being normally provided on the other vehicles such as 2–a and 2–b. It is obvious that the train may be formed by any desired number of vehicles of this type.

Each one of the vehicles includes a hull 4, for instance of light-alloy sheets, supported by ribs such as 4–a (FIGURE 2). The hull is formed with a given number of pairs of wheels 5, one wheel of each pair being located on each side of the hull. In the example illustrated, the front vehicle comprises two pair of wheels, while the other vehicles carry three pairs.

The wheels of each pair are secured on an axle member 6 (FIGURE 3), if desired, through a disconnectible coupling thus enabling the vehicle to be rotated by disengaging one or the other of the wheels.

Each one of the axle members 6 is connected by a transmission gear 7, preferably with a variable ratio, to a motor 8. Motors 8 are mounted on the hull, on a lower deck or floor 9, which is also adapted to store luggage or freight. Besides this lower deck, there is also provided an upper deck 10 for passengers' use.

Each one of the wheels 5 comprises a frame 11, of light metal for instance, formed with a housing 12 for the passage of the axle stub 6 on which the frame is secured, for instance by means of pins such as 13. Frame 11 is divided in two annular compartments by means of a median partition 14, inner tubes 15 being located in said compartments and adapted to be inflated through valves 16 passing through removable flanges 17. The inflating pressure may be of the order of 2 kg./sq.cm.

The resulting assembly constitutes the floating arrangement and the various pairs of wheels, suitably distributed along the vehicle, while assuring thereto a high stability and reducing the draught of the hull.

The propulsion effect is obtained through vanes 18 having a herring-bone pattern, supported on central brackets 19 forming an extension of partition 14 and on side brackets 20 integral with flanges 17 to which these are connected by radially extending reinforcing arms 21 (FIGURE 5). A free space 22 is formed between the frame and the vanes (FIGURE 6).

When the wheels are put in motion, the hull is lifted up and the vehicle is supported only through its wheels which roll literally on the water. The resistance to the forward movement of the device is thus substantially reduced and the train of vehicles may reach high speeds while remaining surprisingly stable and readily controllable.

Hull 4 of the vehicles comprises at its upper end side panels 22 supported on hinge members 23, and which may be either closed and maintained so by means of locking devices such as 24 (FIGURE 2), or folded back horizontally over the wheels and secured, in this case, by means of lifting jacks or bars 25 inserted into flanges 26, as best shown in FIGURE 4; the panels thus arranged impeding any splashing of water by the wheels, while improving the overall stability during the running of the vehicle.

The coupling of the said vehicle to the second vehicle is effected, as shown in FIGURE 3, by means, on one hand, of cables 27 and 28, and on the other hand, a ball-joint plate or pulley 29. The cables 27 and 28 extend from a central capstan 30, pass in side guides 31 secured to the hull then intersect on rear pulleys 32 whence they pass onto guides 33 of the second vehicle, and are secured to the latter as at 34. By acting on capstan 30, it is possible to cause the train of vehicles to turn, since this actuation shortens cable 27 (or 28), while slacking the other cable, causing the head vehicle to turn to the left or right, as the case may be. Successive vehicles are connected to each other as indicated at the left end of FIGURE 3, the cables 27', 28' being secured to the respective vehicles as at 35 and intersecting at the ball-joint plate or pulley 29. This type of coupling is extremely resistant, while allowing, in addition, comparatively important movements between the individual vehicles.

Various modifications and variations may be carried out on the embodiment described and illustrated, and particularly as to the details of construction, without departing from the spirit and scope of the invention.

What I claim is:

A navigational vehicle comprising, in combination, an elongated hull, at least four wheels mounted in pairs and located on both sides of said hull, in such a manner as to rotate about axle members substantially perpendicular to the longitudinal plane of the hull, said wheels comprising, at their intermediate portion, a tight recess which enables them to function as floating wheels, and at the periphery thereof transversal vanes adapted to bear on the water in order to ensure the propulsion of the vehicle, and means for rotating said wheels around their axes, each wheel comprising a frame enclosing at least one inflated inner tube and supporting vane members shaped as a herring-bone pattern, the top of which is located substantially in the planes passing through the axis of rotation of the wheels, said vane members being spaced apart from the frame.

References Cited by the Examiner

UNITED STATES PATENTS

| | | | |
|---|---|---|---|
| 582,811 | 5/97 | Davidson | 115—19 |
| 805,268 | 11/05 | Donnelly | 115—6 |
| 1,049,661 | 1/13 | Bretney | 115—19 |
| 1,432,401 | 10/22 | Lloyd | 280—419 |
| 1,569,392 | 1/26 | Raffaelli | 115—19 |
| 2,259,438 | 10/41 | DeGallier | 115—19 |
| 2,432,107 | 12/47 | Williams | 115—1 |
| 2,843,417 | 7/58 | Wahl | 105—18 X |

FOREIGN PATENTS 1,247,972  10/60  France.

MILTON BUCHLER, *Primary Examiner.*

RALPH D. BLAKESLEE, *Examiner.*